United States Patent [19]

Abolins et al.

[11] 4,013,613

[45] Mar. 22, 1977

[54] REINFORCED INTERCRYSTALLINE THERMOPLASTIC POLYESTER COMPOSITIONS

[75] Inventors: Visvaldis Abolins, Delmar; Fred F. Holub, Schenectady, both of N.Y.

[73] Assignee: General Electric Company, Pittsfield, Mass.

[22] Filed: Oct. 1, 1971

[21] Appl. No.: 185,886

[52] U.S. Cl. .............................. 260/40 R; 260/873
[51] Int. Cl.² ....................................... C08L 67/02
[58] Field of Search ................. 260/40 R, 860, 873

[56] References Cited

UNITED STATES PATENTS

| | | | |
|---|---|---|---|
| 3,005,795 | 10/1961 | Busse et al. | 260/873 X |
| 3,329,740 | 7/1967 | Battersby | 260/860 |
| 3,361,848 | 1/1968 | Siggel et al. | 260/873 |
| 3,431,238 | 3/1969 | Borman | 260/860 |
| 3,435,093 | 3/1969 | Cope | 260/873 X |
| 3,516,957 | 6/1970 | Groz et al. | 260/40 R X |
| 3,546,320 | 12/1970 | Duling et al. | 260/860 |
| 3,562,200 | 2/1971 | Jones et al. | 260/40 R |
| 3,579,609 | 5/1971 | Sevenich | 260/873 |
| 3,595,937 | 7/1971 | Weissermel et al. | 260/860 |
| 3,597,372 | 8/1971 | Cook | 260/873 X |
| 3,624,024 | 11/1971 | Caldwell et al. | 260/40 R |
| 3,639,331 | 2/1972 | Hattori et al. | 260/40 R X |
| 3,644,267 | 2/1972 | Jackson et al. | 260/873 |
| 3,671,487 | 6/1972 | Abolins | 260/40 R |
| 3,673,139 | 6/1972 | Hrach | 260/873 |
| 3,742,087 | 6/1973 | Nield | 260/40 R X |

FOREIGN PATENTS OR APPLICATIONS

| | | | |
|---|---|---|---|
| 879,151 | 8/1971 | Canada | 260/40 R |

*Primary Examiner*—Melvyn I. Marquis
*Assistant Examiner*—S. M. Person
*Attorney, Agent, or Firm*—William F. Mufatti; Edward A. Hedman

[57] ABSTRACT

Intercrystalline normally rigid thermoplastic compositions comprising a combination of (a) very rapidly crystallizable polyester, (b) a crystalline or amorphous polymer and (c) a reinforcing filler for the combination. There are also provided such compositions including flame retardant agents.

7 Claims, No Drawings

REINFORCED INTERCRYSTALLINE THERMOPLASTIC POLYESTER COMPOSITIONS

This invention relates to reinforced intercrystalline thermoplastic compositions for molding and conversion to films, fibers, sheets and the like. More particularly, it pertains to normally solid compositions comprising a combination of a very rapidly crystallizing polyester, at least one second polymer, and a reinforcing filler for the combination. Also contemplated are flame retardant and non-dripping forms of such compositions.

BACKGROUND OF THE INVENTION

High molecular weight linear polyesters and copolyesters of glycols and terephthalic or isophthalic acid have been available for a number of years. These are described inter alia in Whinfield et al. U.S. Pat. No. 2,465,319 and in Pengilly, U.S. Pat. No. 3,047,539. These patents disclose that the polyesters are particularly advantageous as film and fiber formers.

The most commonly employed polyester prepared by these teachings, poly(ethylene terephthalate), has not been widely accepted for use as a molding resin, however, until only fairly recently, because of its relative brittleness in thick sections when crystallized from the melt. The problem was overcome by varying the crystal texture, e.g., by using two step molding cycles or by including nucleating agents, and by molecular weight control. This permitted the marketing of injection-moldable poly(ethylene terephthalates) which typically, in comparison with other thermoplastics, offer a high degree of surface hardness and abrasion resistance, and lower surface friction. Solvent resistance is outstanding, making such compositions uniquely useful in the automotive and aircraft industries. Among the disadvantages of poly(ethylene terephthalate) in molding compositions are the relatively high cost of manufacture (because of the need to control crystal texture), a relatively low degree of moisture resistance, a rapid burning rate and a tendency to drip flaming resin while burning.

Surprisingly, it has been found that the need to employ nucleating agents or two stage molding cycles to avoid brittleness in thick mold sections is obviated if higher homologs of poly(ethylene terephthalate) are mixed with it or substituted for it. For example, within the broad disclosure of the Whinfield et al. and Pengilly patents there exists a family of polyester resins which are normally crystalline and which rapidly crystallize from the melt. These crystallize so rapidly, in fact, that standard injection molding cycles can be used and there is no need to include nucleating agents in the formulation. Parts molded from such polyesters, in contrast to those of poly(ethylene terephthalate) alone, have good impact strength in thick sections.

The rapidly crystallizable higher homologs comprise generally polyester resins which are poly(alkylene terephthalates, isophthalates or mixed terephthalates and isophthalates), wherein the alkylene groups contain from 3 to 10, and especially 3 to 6, carbon atoms.

Simultaneously with the development of injection molding grades of poly(ethylene terephthalate) resins, fiber glass reinforced compositions were also provided. See Furukawa et al. U.S. Pat. No. 3,368,995. These injection moldable compositions provided all of the advantages of unfilled polyesters and, also, because of the glass reinforcement, the molded articles had higher rigidity, yield strength, modulus and impact strength.

However, because they used poly(ethylene terephthalate) the Furukawa et al compositions required two stage molding or the use of nucleating agents to avoid embrittled thickly molded sections. Moreover, they retained the disadvantages inherent in polyesters generally, having a relatively high cost of manufacture and formulation, and low degree of moisture resistance, high flammability and a tendency to drip while burning.

Although substitution of the rapidly crystallizable higher homologs of poly(ethylene terephthalate) would be expected to overcome the need for two stage molding cycles or nucleating agents, such compositions, in common with those described by Furukawa et al., would still be expensive, unstable to moisture, flammable and would drip while burning. While resistant to gasoline, jet fuels, hydraulic fluids and the like, such compositions would be of limited utility in the automotive and aircraft industries because of their flammability. On the other hand, because of moisture sensitivity, their use in kitchens, laundries, on shipboard, and the like, would be limited.

It has now been discovered that a new family of composites are provided if the rapidly crystallizable polyesters are combined with at least one other polymer and a reinforcing filler. Without the filler component, great difficulty is experienced in processing the blend of two polymers. Surprisingly, as little as 1% by weight of reinforcing filler, such as glass, provides unexpected improvement in processability, surface appearance and physical properties.

It is a primary object of this invention to provide reinforced compositions in which the properties of one of the polymeric components are used to enhance the properties of the second polymeric component.

Merely by way of illustration, the hydrolytic stability of poly(1,4-butylene terephthalate) will be enhanced according to this invention by forming a reinforced combination with polyolefins and the strength, rigidity and resistance to heat distortion of polyolefins will be improved by forming a reinforced combination with poly(1,4-butylene terephthalate).

It is surprising and unexpected to find that such polyesters form useful combinations with a remarkably broad range of polymers. Usually, when such mixtures including at least one highly crystallizable polymer are molded and cooled, they are non-uniform and tend to delaminate. In contrast to the expected behavior, rapidly crystallizable polyesters have now been found readily to form composites with crystalline, amorphous and partially crystalline and partially amorphous polymers and, after reinforcement, such new compositions are easily moldable and extrudable into articles which are uniform and which do not delaminate. All of these characteristics of the new compositions of this invention indicate that an intercrystalline or crystalline-amorphous combination is formed between the polyester and the second co-blended polymer. In addition, the enhancement is strength of the composite is evidence that the reinforcing filler, e.g., a metal, ceramic, silica, quartz, asbestos, silicate, titanate, carbon black, clay, glass, and the like, is unexpectedly and strongly bonded into the combination. Moreover, the reinforcing filler is essential ingredient in the combination to obtain the required physical properties and processability.

In addition to the other principal objects mentioned above, it is a further object of this invention to provide compositions exhibiting improved resistant to distortion by heat, even at very low levels of reinforcement, improved surface appearance, improved processability and other commercially significant properties.

It is a further object of this invention also to provide the novel reinforced compositions in flame retardant and non-dripping embodiments.

DESCRIPTION OF THE INVENTION

According to this invention there are provided reinforced intercrystalline normally rigid thermoplastic compositions comprising in combination a. at least one high molecular weight normally crystalline polyester resin which crystallizes very rapidly from the melt;

b. at least one high molecular weight normally crystalline, normally amorphous or normally partially crystalline and partially amorphous polymer in the concentration range of from 1 to 99 parts by weight of (a) to 99 to 1 parts by weight of (b); and c. a reinforcing amount of reinforcing filler for the combination.

When used herein, and in the appended claims, the term "in combination" contemplates resins which reinforce each other when melted together and which remain intimately combined when cooled and solidified. Therefore, combinations in which the components (a), (b) and (c) either delaminate or separate when cooled or in which the gross physical properties, chemical resistance, macroscopic appearance, and the like, clearly manifest failure to form structurally useful compositions, are excluded from this invention.

With respect to the polyester resin component (a), there will be selected a high molecular weight normally crystalline polycondensation product of a difunctional organic alcohol or reactive derivative thereof and a difunctional organic acid or a reactive derivative thereof. The difunctional alcohol and the difunctional acid can be wholly aliphatic or wholly aromatic or partially aliphatic and partially aromatic in character, the organic groups being straight chained, or branched, cyclic or polycyclic and containing from 2 to 20, preferably from 3 to 10, especially preferably from 3 to 6, carbon atoms. The organic groups can be unsubstituted or substituted with conventional substituents, such as alkyl, halogen, carboxyl, nitro, cyano, amido, imido, and similar groups.

While a wide variety of polyesters are suitable for this invention, it is important that they be normally crystalline, high enough in molecular weight to form films and fibers (although this is merely a measure of a suitable molecular weight and not a limitation on ultimate use) and, most importantly, very rapidly crystallizable from the melt.

Polyesters which meet the criterion of being rapidly crystallizable from the melt will be those which can be injection molded into a relatively cold mold at about 170° F. in a standard, short cycle time and produce a rigid workpiece which is highly crystalline throughout. As is described in Furukawa et al., U.S. Pat. No. 3,368,995, poly(ethylene terephthalate) will not produce such a workpiece because of its high crystalline melting point and low heat conductivity. Because such a polyester resin is not rapidly crystallizable, the outer part of the workpiece is amorphous, and the inner part, which is gradually cooled, is crystalline.

One convenient way to determine if a polyester is suitable for use in this invention is to injection mold it with the mold temperature of 160°-175° F in a standard short cycle, e.g., 10-90 seconds, into a workpiece about ½ inch thick. If the molded piece is rigid on removal from the mold and the inner and outer parts of the piece are uniformly milky or white and opaque and if the hardness, measured, e.g., with a Rockwell M tester, is uniform throughout, crystallization from the melt is rapid enough to be suitable. If, on the other hand, the workpiece is clear, transparent or semitransparent (i.e., amorphous) on the outside and milky, white or opaque (i.e., crystalline) only on the inside; if the hardness is non-uniform throughout; if the workpiece is relatively soft on removal from the mold and brittle after it cools; or if uniformity can be achieved only by using a two stage molding cycle, or higher mold temperatures, e.g., 250°-330° F. and long times, e.g., 90-400 sec., or by including a nucleating agent, e.g., carbon powders, metal salts or clays, then the polyester resin is not suitable for this invention.

Typical of the high molecular weight rapidly crystallizable polyester resins suitable for this invention are poly(alkylene terephthalates, isophthalates or mixed terephthalates and isophthalates), wherein the alkylene groups contain from 3 to 10 carbon atoms. They are available commercially or can be prepared by known techniques, such as by the alcoholysis of esters of the phthalic acid with a glycol and subsequent polymerization, by heating glycols with the free acids or with halide derivatives thereof, and similar processes. These are described in U.S. Pat. No. 2,465,319 and 3,047,539, and elswhere.

Although the glycol portion of such typical polyesters can contain from 3 to 10 carbon atoms, e.g., 1,3-propylene, 1,4-butylene, 1,3-butylene, 1,2-propylene, 1,2-butylene, 2,3-butylene, 1,6-hexylene, 1,10-decylene, etc., it is preferred that it contain 3 or 4 carbon atoms, in the form of linear methylene chains.

Preferred polyesters will be of the family consisting of high molecular weight, polymeric 1,4-butylene glycol terephthalates or isophthalates having repeating units of the general formula

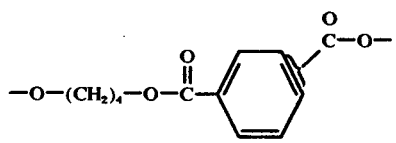

and mixtures of such esters, including copolyesters of terephthalic and up to about 30% isophthalic acids.

Especially preferred polyesters are poly(1,4-butylene 70/30 iso- terephthalate) and poly(1,4-butylene terephthalate). Special mention is made of the latter because it is easy to prepare from readily available materials and crystallizes at an especially rapid rate.

Illustratively, sufficiently high molecular weight polyesters of the preferred type will have an intrinsic viscosity of at least 0.2 and preferably about 0.4 deciliters/gram as measured in o-chlorophenol, a 60/40 phenol-tetrachloroethane mixture or a similar solvent at 25°-30° C. The upper limit is not critical, but will generally be about 1.5 dl./g. Especially preferred polyesters will have an intrinsic viscosity in the range 0.5 to 1.3.

With respect to the co-blending polymer (b), these will be selected from one or more of high molecular weight normally crystalline, normally amorphous or normally partially crystalline and partially amorphous polymers which form with polyester component (a) a reinforceable combination within the concentration range of from 1 to 99 parts by weight of (a) to 99 to 1 parts by weight of (b).

It is to be understood that not all of the suitable polymers will form reinforceable combinations over the entire stated composition range. Numerous such polymers will form reinforceable combinations within only portions of this range, and all non-reinforceable combinations of polyesters and such polymers within the stated range are therefore not included in this invention. Non-reinforceable combinations are those which persons skilled in the art will readily recognize as failing to meet the criteria set out above, i.e., they may or may not combine each other when melted, but, when cooled, they will separate or delaminate, lose physical properties, etc.

The co-blending, combining polymers will form an intercrystalline normally rigid reinforceable composition with the normally crystalline polyester. Accordingly, the blending polymer component (b) can itself be normally crystalline, normally amorphous or mixed crystalline and amorphous. Crystallinity as used herein is that which arises from a state of molecular structure which denotes compactness of the molecular chains forming the polymer. It is attributable to the formation of solid crystals having a definite geometric form.

As is well understood by those skilled in the art, the same high molecular weight polymer, depending often on the way it is produced, can exist in wholly crystalline, wholly amorphous or partially crystalline and partially amorphous form. Merely by way of illustration, polymers of the same alpha olefin, e.g., poly(1-butene), have different steric structures, and depending on their steric configurations, they may be crystallizable or amorphous, or mixed.

Although as will be seen, polymer (b) can be either normally solid or normally rubbery, the compositions of this invention are all normally rigid. Therefore, if polymer (b) is rubbery, the maximum amount used is that which insures that the final composition will be rigid at ordinary temperatures, e.g., about 75°–90° F.

In general, the polymer component (b) of this invention will be a polymerization product of i. at least one aliphatic ethylenically unsaturated monomer, e.g., ethylene or an olefin of from 4 to 10 carbon atoms, e.g., butene-1, butadiene, methyl pentene, decene-1, and the like, including vinyl monomers, such as a vinyl halide or a vinylidene halide, for example, vinyl chloride, vinylidene chloride, or vinyl alkanoates, e.g., vinyl acetate, acrylic monomers such as acrylic acid, acrylic esters, alkyl methacrylates, acrylic nitriles, such as acrylonitrile, methacrylonitrile, and the like. (The term "aliphatic" is intended to exclude polymers and copolymers of vinyl aromatic compounds, e.g., styrene and the like.);

ii. at least one difunctionally reactive compound which is polymerizable by condensation, such as formaldehyde, trioxymethylene, phenols, e.g., 2,6-dimethylphenol, siloxanes, lactams, e.g., caprolactam, aromatic sulfides, and the like;

iii. at least two difunctionally reactive compounds which are polymerizable by polycondensation, such as a diamine, e.g., hexamethylenediamine, and a dicarboxylic acid, e.g., adipic acid, a polyorganosiloxane and an aromatic ester, a bis maleimide and an amine, an ether of a bis phenol and a dichlorodiphenyl sulfone and the like; or iv. a mixture of the polymerization products of (i), including vinyl aromatic compounds, e.g., styrene, and (ii), such as blended combinations of polystyrene and polyphenylene ether; polyethylene or polybutene-1 and a polyphenylene ether, polystyrene with a wholly aromatic polyester, e.g., from resorcinol and terethphaloyl chloride, and the like.

Among the preferred features of this invention are compositions wherein polymer (b) is a polymerization product of at least one aliphatic ethylenically unsaturated monomer and is selected from polyethylene and other polyolefins and copolymers of such monomers, for example, polyethylene, poly(methylpentene), normally solid copolymer of ethylene and butene-1, copolymers of ethylene and ethyl acrylate, or vinyl acetate, butadiene-acrylonitrile copolymers, ionomers, poly(methyl methacrylate), polyisobutylene rubbers and the like, poly(vinyl chloride), poly(vinylidene chloride), a copolymer of vinyl chloride with vinyl acetate, natural rubber, a rubbery copolymer of butene-1 and ethylene, a rubbery copolymer of butadiene and acrylonitrile, and the like. All such polymers are commercially available or can be prepared by techniques well known to those skilled in the art. As to the copolymers and terpolymers, the proportions of the repeating units may vary broadly and will be selected to provide the desired characteristics, i.e., normally rubbery, normally solid, and the like. In addition to the polymers illustrated above, other suitable polymerization products of aliphatic ethylenically unsaturated monomers include derivatives thereof, such as halogenated hydrocarbon polymers, e.g., chlorinated polyethylene, chlorosulfonated polyhydrocarbons and polymerized carboxy-substituted butadiene and the like.

Other preferred polymer (b) components are selected from polyacetal homopolymers, such as polyoxymethylene, polyacetal copolymers, such as those based on trioxane, polyphenylene ethers, such as poly(2,6-dimethyl-1,4-phenylene)ether, polysulfones, such as the condensation product of bisphenol-A and 4,4'-dichlorodiphenyl sulfone, polyamides, such as polycaprolactam, or the product of hexamethylenediamine and adipic acid, polyimides, e.g., the product of bismaleimido diphenyl methane and methylene dianiline, normally solid or normally rubbery polyorganosiloxanes, such as polyalkyl or aryl-siloxanes, or combinations of the two, and copolymers of polyorganosiloxanes with vinyl aromatics, e.g., styrene, acrylic monomers, e.g., methyl methacrylate, or aromatic esters, e.g., the reaction products of bisphenol-A and iso or terephthaloyl chloride, as well as siloxane-nitrogen copolymers containing amido, amide-imido and imide groups. All such polymers are either commercially available or can be made in ways known to those skilled in the art.

Also preferred are polymer components (b) which comprise mixtures of any of classes (i), (ii) and/or (iii). For example, one such mixture would comprise a high molecular weight composition which is a combination of polystyrene or other styrene resin, including rubber modified polystyrenes (i) with a condensation product of 2,6-dimethylphenol, i.e., poly(2,6-dimethyl-1,4-phenylene)ether.

Especially preferred compositions within the scope of this invention are those in which the alloyed combination contains from about 1 to 99 parts by weight, and preferably from 15 to 85 parts by weight, of a poly(alkylene terephthalate, isophthalate or mixed terephthalate and isophthalate), having from 3 to 10 carbon atoms in the alkylene group, and from about 99 to 1, and preferably from 95 to 5 parts by weight of either a high molecular weight poly(methyl methacrylate); a polyethylene, preferably a high density polyethylene, an acetal copolymer; a polyamide; a polyphenylene ether resin or a polyphenylene ether resin in combination with a styrene resin; a normally solid copolymer of ethylene and butene-1; or a normally crystalline wholly aromatic polyester. The preferred polyester (a) is poly(1,4-butylene terephthalate).

All if the present combinations include, as an essential ingredient, a reinforcing amount of a reinforcing filler (c). In general, any reinforcement can be used, e.g., fibers whiskers or platelets of metals, e.g., aluminum, iron or nickel, and the like, and non-metals, e.g., carbon filaments, silicates, asbestos, $TiO_2$ and titanate whiskers, glass flakes and fibers and the like. It is to be understood that, unless the filler adds to the strength, stiffness and impact strength of the composition, it is only a filler and not a reinforcing filler as contemplated herein.

Although it is only necessary to have at least a reinforcing amount of the reinforcement present, in general, the combination of components (a) and (b) will comprise from about 20 to about 99 parts by weight and the filler will comprise from about 1 to about 80 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ to about 1 inch long, preferably less than ¼ long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (⅛).

In general, best properties will be obtained if the sized filamentous glass reinforcement comprises from about 1 to about 80% by weight based on the combined weight of glass and polymers and preferably from about 5 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame retardant. Sizings, if present can readily be removed by heat cleaning or other techniques well known to those skilled in the art.

It is a preferred feature of this invention also to provide flame retardant glass reinforced thermoplastic compositions, as defind above, wherein the polyester is normally flammable, the composition also including d. a flame retardant additive in a minor proportion but in an amount at least sufficient to render the polyester resin non-burning or self-extinguishing.

A preferred feature of the invention is a flame retardant composition as above defined, which also includes e. a polytetrafluoroethylene resin or a fumed colloidal silica in a minor proportion based on the composition but in an amount at least sufficient to render said polyester resin non-dripping, when burning.

When used herein, the terms "non-burning", self-extinguishing" and "non-dripping" are used to describe compositions which meet the standards of ASTM test method D-635 and Underwriters' Laboratories Bulletin No. 94. Another recognized procedure to determine flame resistance of resinous compositions is the Oxygen Index Test or LOI (Limiting Oxygen Index). This test is a direct measure of a product's combustibility based on the oxygen content of the combustion atmosphere. Appropriate specimens are placed in a combustion chimney and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test Method D-2863. The compositions of this invention which contain flame-retardant additives in the specified amounts have a substantially higher oxygen index and thus are much less combustible than the controls.

The flame-retardant additives (d) useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition — major proportions will detract from physical properties — but at least sufficient to render the polyester resin-blend non-burning or self-extinguishing. Those skilled in the art are well aware that the amount will vary with the nature of the polymers in the blend and with the efficiency of the additive. In general, however, the amount of additive will be from 0.5 to 50 parts by weight per hundred parts of components (a) plus (b). A preferred range will be from about 3 to 25 parts and an especially preferred range will be from about 5 to 15 parts of additive per 100 parts of (a) plus (b). Smaller amounts of compounds highly concentrated in the elements responsivle for flame-retardance will be sufficient, e.g., elemental red phosphorus will be preferred at 0.5 to 10 parts by weight per hundred parts of (a) plus (b), while phosphorus in the form of triphenyl phosphate will be used at 5 to 25 parts of phosphate per part of (a) plus (b), and so forth. Halogenated aromatics will be used at 2 to 20 parts and synergists, e.g., antimony oxide, will be used at about 1 to 10 parts by weight per 100 parts of components (a) plus (b).

Among the useful halogen-containing compounds are those of the formula

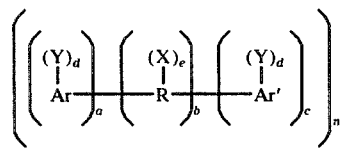

wherein $n$ is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur-containing linkage, e.g., sulfide, sulfoxide, sulfone, carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be a dihydric phenol, e.g., bisphenol-A, carbonate linkage. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc, said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter $e$ represents a whole number ranging from 0 to a maximum controlled by the number of replaceable hydrogens on R. The letters $a$, $b$, and $c$ represent whole numbers including 0. When $b$ is not 0, neither a nor $c$ may be 0. Otherwise either $a$ or $c$, but not both, may be 0. Where $b$ is 0, the aromatic groups are joined by a direct carbon-carbon bone.

The hydroxyl and Y substituents on the aromatic groups, Ar and Ar' can be varied in the ortho, meta or para positions on the aromatic rings and the groups can bein any possible geometric relationship with respect to one another.

Included within the scope of the above formula are di-aromatics of which the following are representative:
2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2,-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane.

The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

Especially preferred are hexabromobenzene and chlorinated biphenyls or terphenyls, alone, or mixed with antimony oxide.

In general, the preferred phospate compounds are selected from elemental phosphorus or organic phosphonic acids, phosphonates, phosphinates, phosphonites, phosphinites, phosphene oxides, phosphenes, phosphites or phosphates. Illustrative is triphenyl phosphene oxide. These can be used alone or mixed with hexabromobenzene or a chlorinated biphenyl and, optionally, antimony oxide.

Typical of the preferred phosphorus compounds to be employed in this invention would be those having the general formula

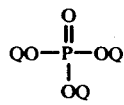

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl)phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(axiridinyl)-phosphine oxide or tetrakis(hydroxymethyl)phosphonium chloride. These flame-retardant additives are commercially available.

The polytetrafluoroethylene resins used in this invention as dripping retarding agents (e) are commercially available or can be prepared by known processes. They are white solids obtained by free radical initiated polymerization of tetrafluoroethylene in aqueous media with free radical catalysts, e.g., sodium, potassium or ammonium peroxydisulfates at 100 to 1000 psi. at 0°–200° C. and preferably at 20°–100° C. See Brubaker, U.S. Pat. No. 2,393,967. While not essential, it is preferred to use the resins in the form of relatively large particles, e.g., of average size 0.3 to 0.7 mm., mostly 0.5 mm. These are better than the usual polytetrafluoroethylene powders which have particles of from 0.05 to 0.5 millimicrons in diameter. It is especially preferred to use the relatively large particle size material because it tends to disperse readily in polymers and bond them together into fibrous networks. Such preferred polyethylenes are designated by ASTM as Type 3, and are available commercially from the DuPont Company (TEFLON Type 6) for general use in the extrusion of thin-walled tubular goods and tape.

The amount of polytetrafluoroethylene to be used can vary widely, from an amount at least sufficient to render the polyester non-dripping (when burning) but usually will be from about 0.1 to about 10 parts and preferably from about 0.5 to about 2.5 parts by weight per hundred parts by weight of the combination of components (a) plus (b).

The fumed colloidal silica employed in the non-dripping embodiments is preferably a finely powdered form. A silica which is particularly preferred is commercially available as Cab-O-Sil EH-5 from the Cabot Corporation. Cab-O-Sil EH-5 is a submicroscopic fumed silica having on a dry basis 99% silicon dioxide. It has a surface area of 390 ± 40 m$^2$/gm. (BET), a nominal particle size of 0.007 micron, a maximum density of 2.3 lbs./cu.ft., an ignition loss of 2.5% (1000° C. on a moisture free basis) and a pH of 3.5–4.2 (4% aqueous dispersion). The fumed colloidal silica may be employed at a range of 0.25 to 4 parts by weight per 100 parts by weight of components (a) plus (b). However, a particularly preferred range is 0.5 to 2.5 parts by weight. Within this particularly preferred range it has been found advantageous to employ in most compositions about 1.25 parts by weight per 100 parts by weight of components (a) plus (b).

The reinforcements are added in any usual manner, e.g., by dry mixing or by mixing in the melted state in an extruder, on a heated mill or in other mixers.

By way of illustration, glass roving (a bundle of strands of filaments) is chopped into small pieces, e.g., ⅛ to 1 inch in length, and preferably less than ¼ inch in length and put into an extrusion compounder with (a) the polyester resin, (b) the co-blending polymer and, if used, (d) the flame retardant additive (s) and (e) polytetrafluoroethylene or fumed colloidal silica to produce molding pellets. The fibers are shortened and predispersed in the process, coming out at less than 1/16 inch long. In another procedure, glass filaments are ground or milled to short lengths, and are mixed with the polyester resin, co-blending polymer and, optionally, flame retardant additive and polytetrafluoroethylene resin or fumed colloidal silica, by dry blending then either fluxed on a mill and ground, or they are extruded and chopped. In still another procedure continuous lengths of glass roving are drawn through a bath of melted polyester resin, the co-blending, second polymer and, optionally, the flame retardant additive and polytetrafluoroethylene resin, or fumed colloidal silica, e.g., in an extruder, which procedure coats the filaments, and then the resincoated glass strand is comminuted into pellets to form a molding compound. The glass fibers can also be mixed with resin and additives and directly molded, e.g., by injection or transfer molding techniques.

It is always very important to thoroughly free all of the ingredients, polyester resin, co-blending polymer, reinforcing filler, and flame retardant additives, from as much water as possible.

In addition, compounding should be carried out to insure that the residence time in the machine is short; the temperature is carefully controlled; the frictional heat is utilized; and an intimate blend between the resin and the additives is obtained.

Although it is not essential, best results are obtained if the ingredients are precompounded, pelletized and then molded. Precompounding can be carried out in conventional equipment. For example, after carefully pre-drying the polyester resin, the coblending polymer and other additives, and the reinforcement, e.g., under vacuum at 100° C. for 12 hours, a single screw extruder is fed with a dry blend of the ingredients, the screw employed having a long transition section to insure proper melting. On the other hand, a twin screw extrusion machine, e.g., a 28 mm. Werner Pfleiderer machine can be fed with resins and additives at the feed port and reinforcement down stream. In either case, a generally suitable machine temperature will be about 250° to 700° F.

The precompounded composition can be extruded and cup up into molding compounds, such as conventional granules, pellets, etc., by standard techniques.

The compositions can be molded in any equipment conventionally used for reinforced thermoplastic compositions. For example, with poly(1,4-butylene terephthalate), good results will be obtained in an injection molding machine, e.g., of the Newbury type, with conventional cylinder temperatures, e.g., 500° F. and conventional mold temperatures, e.g., 150° F. If necessary, depending on the molding properties of the co-blending polymer, the amount of reinforcing filler and the rate of crystallization of the polyester component, those skilled in the art will be able to make the conventional adjustments in molding cycles to accommodate the composition. Typical conditions for a wide variety of materials will be exemplified hereinafter.

DESCRIPTION OF THE PREFERRED EMBODIMENTS

The following examples illustrate the invention. They are set forth as a further description, but are not to be construed as limiting the invention thereto.

EXAMPLES 1-3

The following ingredients are dried in a vacuum at 100° C. for 10 hours:
poly(1,4-butylene terephthalate), m.p., 232° C., intrinsic viscosity, 0.65-0.75 dl./g.;
poly(methyl methacrylate), density 1.17-1.20 g./cc.; and
fibrous glass reinforcement, ⅛ inch.

The dry blends are extruded and molded between 470° and 520° F. into test bars measuring ⅛ × ½ × 2½ inch. The test bars are tested for the following physical properties: Tensile Strength and elongation, ASTM D-638; Flexural strength and modulus, ASTM D-790; Impact strength, ASTM-D-256; Heat distortion temperature, ASTM D-648.

The formulations used and the results obtained are set out in Table 1:

Table 1

| | Physical Properties of Reinforced Polyester - Poly(methyl methacrylate) Compositions | | | |
|---|---|---|---|---|
| Ingredients | Example | | | |
| | 1A | 1 | 2 | 3 |
| poly(1,4-butylene terephthalate) | 0 | 20 | 40 | 60 |
| poly(methyl methacrylate) | 80 | 60 | 40 | 20 |
| ⅛" fibrous glass reinforcement | 20 | 20 | 20 | 20 |
| Properties | | | | |
| Heat distortion temp., ° F. at 264 psi. | 194 | 192 | 320 | 311 |
| Flexural modulus, psi. | 660,000 | 811,000 | 851,000 | 750,000 |
| Impact strength, ft.lbs./in. notch | 1.1 | 1.1 | 1.2 | 1.3 |

Thus, two polymers and glass reinforcement are seen to form highly useful composites. Blends containing 50 mole % of polyester, polymethacrylate show a surprising increase in heat distortion temperature, a maintenance of good impact strength and a very high flexural modulus.

EXAMPLES 4-6

The following ingredients are dried:
poly(1,4-butylene terephthalate), as in Example 1;
polyethylene, high density, 0.940-0.965 g./cc., containing about 4% of butene-1; and
fibrous glass reinforcement, ¼ inch. The dry blends are extruded and molded at 520° F. into test pieces and tested for physical properties.

The formulations used and the results obtained are set out in Table 2:

Table 2

| | Physical Properties of Reinforced Polyester - Polyethylene Compositions. | | | |
|---|---|---|---|---|
| Ingredients (parts by weight) | Example | | | |
| | 4A | 4 | 5 | 6 |
| poly(1,4-butylene terephthalate) | 0 | 20 | 40 | 60 |
| polyethylene | 80 | 60 | 40 | 20 |
| ⅛" fibrous glass reinforcement | 20 | 20 | 20 | 20 |
| Properties | | | | |
| Heat distortion temp., 20 F. at 264 psi. | 212 | 235 | 262 | 392 |
| Flexural modulus, psi. | 273000 | 275000 | 311000 | 348000 |
| Impact strength, notched, ft.-lbs./inch | 2.7 | 1.7 | 1.5 | 1.2 |

At 50 mole % ethylene polymer a high heat distortion temperature as well as good notched impact strength are obtained. Also, as the amount of polyester is increased, both the modulus and the heat distortion temperatures increase.

EXAMPLE 7

The following ingredients are dried:
poly(1,4-butylene terephthalate), as in Example 1;
acetal copolymer, density, 1.40 g./cc.; and
fibrous glass reinforcement, as in Example 1.

The dry blend is melt blended on a two-roll mill and compression molded at 220°–230° C. The formulations used and the results obtained are set out in Table 3:

Table 3

| Physical Properties of Reinforced Polyester - Acetal Copolymer Compositions | | |
|---|---|---|
| Ingredients | Example | |
| (parts by weight) | 7A | 7 |
| poly(1,4-butylene terephthalate) | 0 | 40 |
| acetal copolymer | 80 | 40 |
| fibrous glass reinforcement | 20 | 20 |
| Properties | | |
| Heat distortion temp., ° F. at 264 psi. | 304 | 313 |
| Modulus, psi. | 600000 | 570000 |

The composite according to this invention has an increased heat distortion temperature in comparison with the reinforced acetal copolymer alone.

EXAMPLES 8–13

The following ingredients are dried:
poly(1,4-butylene terephthalate), as in Example 1;
polyamide resin, nylon 6/10, density 1.09 g./cc.;
polyamide resin, nylon 6, density, 1.12–1.14 g./cc.; and
fibrous glass reinforcement, as in Example 1.

The dry blends of nylon 6/10 are melt blended on a two-roll mill at 210°–220° C. and compression molded at 230° C. The dry blends of nylon 6 are extrusion blended at 520° F. The formulations used and the results obtained are set out in Table 4:

Table 4

| Physical Properties of Reinforced Polyester - Polyamide Compositions | | | | |
|---|---|---|---|---|
| Ingredients | Example | | | |
| (parts by weight) | 8A | 8 | 9 | 10 |
| poly(1,4-butylene terephthalate) | 0 | 20 | 40 | 60 |
| polyamide, nylon 6 | 80 | 60 | 40 | 20 |
| ⅛" fibrous glass reinforcement | 20 | 20 | 20 | 20 |
| Properties | | | | |
| Heat distortion temp., ° F. at 264 psi. | 379 | 383 | 410 | 406 |
| Modulus, psi. | 178000 | 330000 | 500000 | 530000 |
| Impact strength, ft.-lbs./in. notch | 3.6 | 2.0 | 1.5 | 1.3 |

As nylon 6 is blended into the polyester, easier processing is obtained. At the 60:20 ratio of nylon to polyester, the modulus increases sharply. This is also true of the 40–40 blend.

Table 4 (cont.)

| Physical Properties of Reinforced Polyester - Polyamide Compositions | | | | |
|---|---|---|---|---|
| Ingredients | Example | | | |
| (parts by weight) | 11A | 11 | 12 | 13 |
| poly(1,4-butylene terephthalate) | 0 | 20 | 40 | 60 |
| polyamide, nylon 6/10 | 80 | 60 | 40 | 20 |
| ⅛" fibrous glass reinforcement | 20 | 20 | 20 | 20 |
| Properties | | | | |
| Heat distortion temp., ° F. at 264 psi. | 408 | 414 | 400 | 421 |
| Modulus, psi. | 400000 | 447000 | 455000 | 356000 |
| Impact strength, ft.-lbs./in. notch | 1.2 | 1.4 | 1.4 | 2.3 |

Improved processing is obtained at the 60–20 blend of polyester and polyamide with increased impact strength and heat distortion temperature.

EXAMPLES 14–16

The following ingredients are dried:
poly(1,4-butylene terephthalate), as in Example 1;
composition comprising poly(2,6-dimethyl-1,4-phenylene) ether and rubber modified, high impact polystyrene, equal parts, density, 1.05–1.10; and
fibrous glass reinforcement, ⅛ inch.

The dry blends are melt blended by extrusion at 460°–520° F. and molded at 520° F. The formulations used and the results obtained are set out in Table 5:

Table 5

| Physical Properties of Reinforced Polyester - Polyphenylene Ether Compositions | | | |
|---|---|---|---|
| Ingredients | Examples | | |
| (parts by weight) | 14 | 15 | 16 |
| poly(1,4-butylene terephthalate) | 20 | 40 | 60 |
| polyphenylene ether | 30 | 20 | 10 |
| polystyrene (rubber modified) | 30 | 20 | 10 |
| ⅛" fibrous glass | | | |

Table 5-continued

| Physical Properties of Reinforced Polyester - Polyphenylene Ether Compositions | | | |
|---|---|---|---|
| Ingredients | Examples | | |
| (parts by weight) | 14 | 15 | 16 |
| reinforcement | 20 | 20 | 20 |
| Properties | | | |
| Heat distortion temp., ° F., at 264 psi. | 260 | 298 | 395 |
| Tensile strength, psi. | 6040 | 6400 | 7500 |
| Flexural Modulus, psi. | 474000 | 580000 | 620000 |
| Impact strength ft.-lbs./in. notch | 1.1 | 1.2 | 1.7 |

Improved extrusion is noticed as the amount of polyester is increased. In addition the composites according to this invention have a smoother molded surface than those containing no polyester. Good impact strengths are obtained with 20–60 polyphenylene ether-polyester combinations along with very high heat distortion temperature and flexural modulus. The procedure is repeated, substituting for the polyphenylene ether-styrene resin combination, an unmodified poly(2,6-dimethyl-1,4-phenylene)ether.

EXAMPLE 17

A dry blend of 60 parts by weight of poly(1,4-butylene terephthalate), 20 parts by weight of an (85-15 p-phenylene isoterephthalate) wholly aromatic polyester, prepared according to U.S. Pat. No. 3,036,990, and 20 parts by weight of fibrous glass reinforcement, as in Example 1 is milled at 240° C. and heated at 300° C. provide a moldable reinforced composition according to this invention.

EXAMPLES 18–23

The following ingredients are dried:
poly(1,4-butylene terephthalate), as in Example 1;
polyethylene, as in Example 4;
fibrous glass reinforcement, as in Example 4;
highly chlorinate polyphenyl, chlorine content 59%, softening point 98°–105° C.;
hexabromobenzene;
antimony oxide;
polytetrafluoroethylene resin, ASTM Type 3, particle size 0.3 to 0.7 mm.

The blends are compounded, molded and tested according to the procedure of Example 1. In addition, the Oxygen Index is determined by ASTM D-2863. The formulations used and the results obtained are set out in Table 6:

Table 6

| Flame Retardant Reinforced Polyester - Polyethylene Compositions | | | |
|---|---|---|---|
| Ingredients | Examples | | |
| (parts by weight) | 18 | 19 | 20 |
| poly(1,4-butylene terephthalate) | 20 | 20 | 20 |
| polyethylene | 60 | 60 | 60 |
| fibrous glass reinforcement | 20 | 20 | 20 |
| chlorinated polyphenyl | 10 | 10 | 10 |
| hexabromobenzene | — | — | — |
| antimony oxide | 4 | — | 8 |
| polytetrafluoroethylene resin | — | — | 1.0 |
| Properties | | | |
| Heat distortion temp., ° F., at 264 psi. | 230–238 | 204–205 | 212–225 |
| Tensile strength, psi. | 6500 | 5500 | 5800 |
| Elongation, % | 6 | 7 | 5 |
| Flexural strength, psi. | 7600 | 6500 | 7400 |
| Modulus, psi. | 238500 | 240900 | 309000 |
| Izod impact strength, ft.-lbs./in. notch | 0.9 | 0.9 | 0.9 |
| Gardner impact strength, in.-lbs. | 1.2 | 1.2 | 1.2 |
| Combustibility | | | |
| Oxygen Index, % | 20.0 | 19.0 | 19.5 |
| | 21 | 22 | 23 |
| poly(1,4-butylene terephthalate) | 20 | 20 | 20 |
| polyethylene | 60 | 60 | 60 |
| fibrous glass reinforcement | 20 | 20 | 20 |
| chlorinated polyphenyl | — | — | — |
| hexabromobenzene | 7 | — | 7 |
| antimony oxide | 3 | 4.4 | — |
| polytetrafluoroethylene resin | — | 1.5 | 1.0 |
| Properties | | | |
| Heat distortion temp., ° F. at 264 psi. | 236–244 | 208–212 | 236–240 |
| Tensile strength, psi. | 5900 | 6100 | 6100 |
| Elongation, % | 4 | 4 | 4 |
| Flexural strength, psi. | 6700 | 7200 | 6900 |
| Modulus, psi. | 299000 | 263000 | 319000 |

Table 6-continued

| Flame Retardant Reinforced Polyester - Polyethylene Compositions | | | |
|---|---|---|---|
| Izod impact strength, ft.-lbs./in. notch | 0.9 | 0.9 | 1.0 |
| Gardner impact strength, in.-lbs. | 1.2 | 1.2 | 1.7 |
| Combustibility Oxygen Index, % | 22.0 | 20.0 | 20.0 |

Flame-retardant, non-dripping (Examples 20, 22 and 23) compositions according to this invention are obtained. Instead of the polytetrafluoroethylene resin, 1.25 parts by weight of fumed colloidal silica can be added to prevent dripping the flame test.

EXAMPLE 24

The procedure of Example 4 is repeated, substituting for the poly(1,4-butylene terephthalate), the following high molecular weight, rapidly crystallizable linear polyesters:
  a 70/30 1,4-butylene terephthalate-1,4-butylene iophthalate polyester;
  poly(1,3-propylene terephthalate) prepared from trimethylene glycol and dimethyl terephthalate by the procedure of U.S. Pat. No. 2,465,319, Example 12; and
  poly(hexamethylene terephthalate) prepared from hexamethylene glycol and dimethyl terephthalate by the procedure of U.S. Pat. No. 2,465,319, m.p., 154° C.

Reinforced compositions according to this invention are obtained.

Obviously, other modifications of the present invention are possible in light of the above teachings.

For example, reinforced compositions according to this invention are obtained if, instead of polyethylene in Example 4, there are substituted:
  poly(4-methyl pentene-1), density 0.83 g./cc.;
  a copolymer of ethylene and ethyl acrylate, density 0.925–0.950 g./cc.;
  poly(vinyl chloride), density 1.35–1.45 g./cc.;
  poly(vinyl chloride - vinyl acetate), density 1.35–1.45 g./cc.;
  poly(vinylidene chloride), density 1.65–1.72 g./cc.;
  natural rubber; and
  a rubbery copolymer of butadiene and acrylonitrile 83:18.

In addition, there can be substituted for polyethylene in Example 4:
  a polyacetal homopolymer, density 1.42 g./cc.;
  a polysulfone, density 1.24 g./cc.;
  a polyimide;
  a polyorganosiloxane;
  copolymers of a polyorganosiloxane with, respectively, styrene, methyl methacrylate and the reaction product of bisphenol-A and isophthaloyl chloride; and
  a siloxane-nitrogen copolymer containing amido, amideimido or imide groups.

The procedure of Example 4 can be repeated, substituting for glass fibers, the following reinforcing fillers:
  aluminum powder;
  bronze power;
  silicate;
  ceramic fibers;
  titanate fibers;
  asbestos fibers;
  quartz; and
  carbon black.

Reinforced composites according to this invention are obtained.

Because of their excellent physical, mechanical, chemical, electrical and thermal properties and the enhanced flamed resistance of certain embodiments, the reinforced polyester-coblending polymer composites of this invention have many and varied uses. The formulations may be used alone as molding powders or mixed with other polymers and may contain various additional, non-reinforcing fillers, such as wood flour, cloth fibers, clays, and the like, as well as pigments and dyes, stabilizers, plasticizers, and the like.

Obviously, other modifications and variations of the present invention are possible in the light of the above teachings. It is therefore, to be understood that changes may be made in the particular embodiments of the invention described which are within the full intended scope of the invention as defined by the appended claims.

We claim:
1. A reinforced intercrystalline normally rigid thermoplastic molding composition comprising, in combination,
  a. at least one high molecular weight normally crystalline polyester resin which very rapidly crystallizes from the melt;
  b. at least one high molecular weight normally crystalline, normally amorphous or normally partially crystalline and partially amorphous polymer which polymer comprises a mixture of a polymerization product of an ethylenically unsaturated monomer and at least one difunctionally reactive compound which is polymerizable by oxidation, said polymer being present in the concentration range of from 1 to 99 parts by weight of (a) to 99 to 1 parts by weight of (b); and
  c. a reinforcing amount of a reinforcing filler for said combination.

2. A composition as defined in claim 1 wherein said ethylenically unsaturated monomer is styrene and said difunctionally reactive compound is 2,6-xylenol.

3. A reinforced intercrystalline normally rigid thermoplastic molding composition comprising, in combination,
  a. a high molecular weight normally crystalline linear poly(alkylene terephthalate, isophthalate or mixed terephthalate and isophthalate), said alkylene groups containing from 3 to 10 carbon atoms;
  b. a high molecular weight poly(methyl methacrylate) in the concentration range of from 1 to 99 parts by weight of (a) to 99 to 1 parts by weight of (b); and
  c. reinforcing filamentous glass, in an amount of from about 1 to 80 percent by weight based on the weight of the combination.

4. A composition as defined in claim 3 wherein said polyester resin is poly(1,4-butylene terephthalate).

5. A reinforced intercrystalline normally rigid thermoplatic molding composition comprising, in combination,
   a. a high molecular weight normally crystalline poly-(alkylene terephthalate, isophthalate or mixed terephthalate and isophthalate), said alkylene groups containing from 3 to 10 carbon atoms;
   b. a high molecular weight normally crystalline wholly aromatic polyester, in the concentration range of from 1 to 99 parts by weight of (a) to 99 to 1 parts by weight of (b); and
   c. reinforcing filamentous glass, in an amount of from about 1 to about 80 percent by weight based on the weight of the combination.

6. A composition as defined in claim 5 wherein said polyester resin is a poly(1,4-butylene terephthalate).

7. A reinforced intercrystalline normally rigid thermoplastic molding composition which consists essentially of,
   a. a high molecular weight normally crystalline poly(1,4-butylene terephthalate) resin;
   b. poly(2,6-dimethyl-1,4-phenylene ether) resin or poly(2,6-dimethyl-1,4-phenylene ether) resin in combination with a polystyrene resin, in the concentration range of from 1 to 99 parts by weight of (a) to 99 to 1 parts by weight of (b); and
   c. reinforcing filamentous glass, in an amount of from about 1 to 80 percent by weight based on the weight of the combination.

* * * * *